Sept. 25, 1956     P. J. KENNEDY     2,764,056
CONSTANT EXPOSURE DEVICE FOR MOTION PICTURE CAMERAS
Filed March 18, 1953     2 Sheets-Sheet 1

INVENTOR.
PETER J. KENNEDY
BY
*Harry M. Saragovitz*
*Attorney*

Sept. 25, 1956      P. J. KENNEDY      2,764,056
CONSTANT EXPOSURE DEVICE FOR MOTION PICTURE CAMERAS
Filed March 18, 1953      2 Sheets-Sheet 2
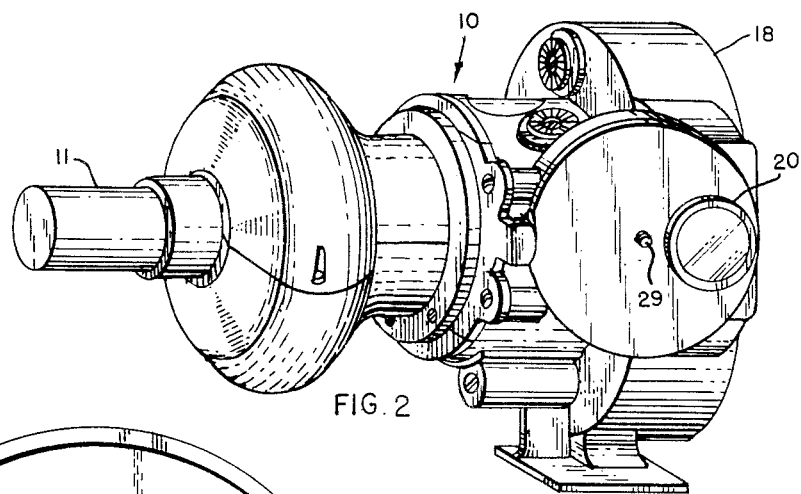
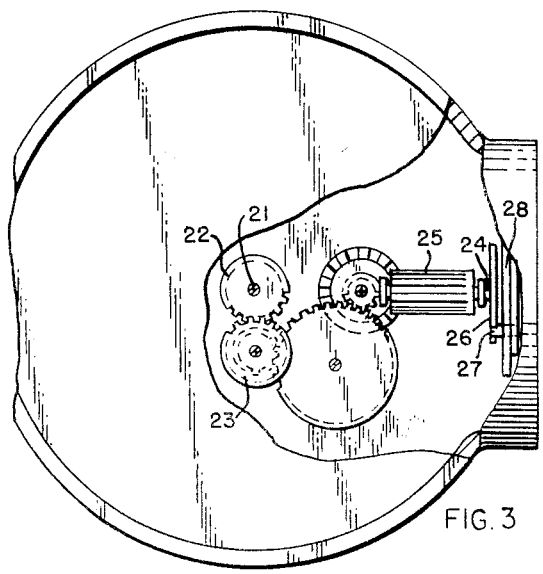
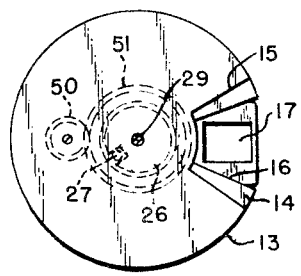
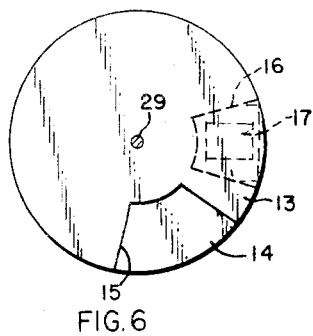
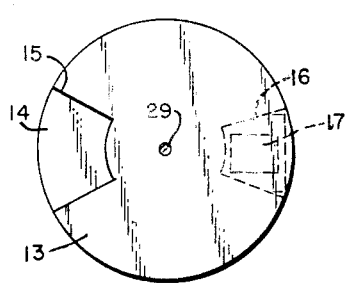
INVENTOR.
PETER J. KENNEDY United States Patent Office 2,764,056
Patented Sept. 25, 1956

2,764,056
CONSTANT EXPOSURE DEVICE FOR MOTION PICTURE CAMERAS

Peter J. Kennedy, Sea Girt, N. J., assignor to the United States of America as represented by the Secretary of the Army Application March 18, 1953, Serial No. 343,270
8 Claims. (Cl. 88—16)
(Granted under Title 35, U. S. Code (1952), sec. 266)

The invention described herein may be manufactured and used by or for the Government for governmental purposes without the payment of any royalty thereon.

This invention relates to a constant exposure device for motion picture cameras and particularly to shutters therefor which admit a fixed quantity of light to the sensitive material while operating the camera at different numbers of exposures per second.

Prior to the present invention the effective automatic regulation of exposure in motion picture work involving rapid changes in frame speed has been found difficult and unsatisfactory. The practice of the principles of the present invention overcomes the difficulties ad undesirable features of existing apparatus for accomplishing the above stated objective.

The invention utilizes a pair of revolving discs having exposure openings therein. One of the discs revolves at a constant speed for all rates of frame exposures and its rate of speed determines the quantity of light reaching the sensitive material during the exposure of each frame. The other disc is so arranged with respect to the first disc that it may be selectively rotated at a speed ratio with respect thereto such that the exposure aperture in each disc will become registered at the film gate at the required frame speed and the intervening frame exposures which would be made by the constant speed disc alone are blanked out by the second disc. The invention further provides means for shifting of speed ratios which is automatically responsive to a change in camera driving speed.

It is a primary object of the invention to provide an exposure controlling means having highly efficient and positive operating characteristics.

It is a further object of the invention to provide an exposure control mechanism for motion picture cameras which functions smoothly and with minimum time delay in changing from one frame speed to another.

A further object of the invention is to provide an exposure control of the type indicated in which the exposure is regulated by means other than the lens diaphragm.

A further object of the invention is to provide an exposure control of the type indicated in which gear operated means is used to maintain positive synchronization of the exposure controlling elements.

Other objects and features of the invention will more fully appear from the following description and will be particularly pointed out in the appended claims.

To present a better understanding of the invention a particular embodiment thereof will be described and illustrated in the accompanyiny drawings in which Fig. 1 is a longitudinal cross-section of the apparatus embodying the invention.

Fig. 2 is a front perspective view of the apparatus.

Fig. 3 is a detail view illustrating a portion of the shutter driving mechanism.

Fig. 4 is a partially diagrammatic view illustrating the position of the shutter elements at maximum frame speed.

Fig. 5 illustrates the relative position of the shutter elements at one-half frame speed when the light measuring element has made one revolution past the film gate after the exposure of a given film frame.

Fig. 6 illustrates the relative position of the shutter elements at one fifth frame speed after the light measuring element has made one revolution following a given film frame exposure.

Figure 1:
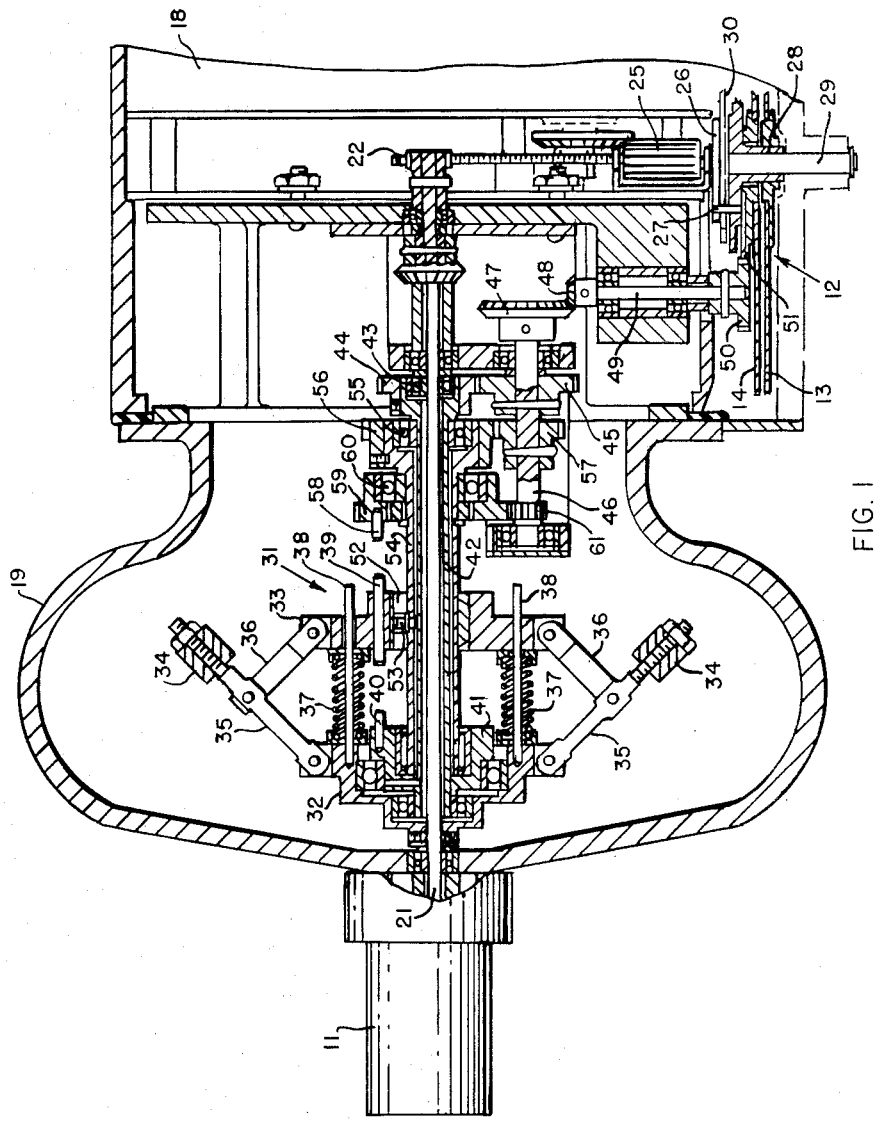

The principles of the invention may be applied to many types of mechanisms. The invention will be presented herein, however, as applied to a camera shutter as one example only of its broad usefulness. In this connection it was found desirable to incorporate the mechanism as an integral part of a motion picture camera. The mechanism may, however, be designed at a unit removable from the camera.

The mechanism of the invention as applied to a motion picture camera is particularly designed to perform a specific duty. In the use of cameras it is many times found desirable to change the frame speed of the camera to adapt it to a particular photographic need. For example, in making successive pictures along the path of travel of an object in free flight, such as a projectile, it is desirable to take very rapid sequence exposures when the object is near the camera and as it moves farther away it may be pictured at less frequent intervals which requires slowing down the shutter speed.

By conventional methods, as the shutter is slowed down or speeded up the quantity of light reaching the film becomes a function of the shutter speed. This is not desirable because there is only one best exposure for a given film and light condition to produce optimum results. To stop down or open up the lens diaphragm manually is not practical or even possible when rapid changes of frame speed are desired at accurately positioned points on the film strip.

Changing the diaphragm opening on the lens is not desirable for certain critical work since such changes very often change the aspect of the picture and moreover many lenses are designed to function best at one particular stop opening.

The invention is best adapted to a camera having a rotating disc type shutter and such a camera is indicated generally at 10 and may be powered by the usual spring motor but since the particular camera to be described is or may be driven in synchronism with other cameras it desirably is powered by a motor 11 which acts thru the novel mechanism of the invention to drive the shutter indicated generally at 12.

The shutter is composed of a pair of discs 13 and 14 which are mounted for rotation upon a common axis and are independently rotatable at different speeds and are each provided respectively with exposure apertures 15 and 16 which function to admit light to the film gate 17 when they are in register at the instant the gate 17 is passed.

The film is housed in a conventional film chamber 18 and is advanced at the required speed by a conventional intermittent film feeding means which is timed to present a fresh frame of film each time the shutter admits light thru the gate 17.

The shutter driving mechanism desirably is inclosed in a casing 19 and the camera lens is mounted in a single lens mount 20 or may be mounted in a turret not shown. The lens mount maintains the lens axis in line with the center of the gate 17.

The motor 11 may be mounted in any suitable position for operating the device. As shown in the drawings it is mounted upon the outer face of the casing 19 with its shaft in axial alignment with and connected to a main drive shaft 21 which is rotatively mounted in a plurality of journals rigid with the casing 19. Desirably, the end of the shaft remote from the motor is provided with a gear 22 which drives an intermeshing gear 23 which in turn drives a shaft 24 disposed at right angles to shaft 21. The drive for the shaft 24 is desirably obtained thru a train of gears from the gear 23 to a gear 25 on the shaft 24. The shaft 24 has a positive driving connection to the disc 13 of the shutter. Thus, the speed of the disc 13 remains in fixed proportion to the speed of the motor and its speed varies directly therewith.

The driving connection between the shaft 24 and the disc may be any suitable construction and as shown in the drawing the shaft 24 has a driving disc 26 secured thereto which has a slot therein within which is received a driving pin 27 which in turn is fixed in the hub of a sleeve shaft 28 which rotates freely on a shaft 29 fixed in the camera frame. The disc 13 is fixed to the shaft 28 and is thus driven by the driving disc 26. The pin 27 also engages and drives a camera film transport mechanism 30 of conventional design.

The other disc 14 of the shutter is driven independently thru a speed ratio shifting mechanism which is controlled by a speed governing means functioning by centrifugal force. The centrifugally operated device will hereinafter be called the governor and is designated generally by the numeral 31. It is composed of two main elements the element 32 of which is fixed upon and rotates with the main shaft 21 while the other element 33 rotates with the main shaft but is movable axially thereof. The axial motion of the member 33 is derived from the centrifugal force developed by a pair of weights 34 secured to the outer ends of a pair of levers 35 which are fulcrumed upon the periphery of the member 32 and thus rotate with the shaft 21. A second pair of short levers 36 are pivoted at one end to the levers 35 at a point between the weights and their fulcrum points. The other ends of the levers 36 are pivoted to the axially slidable member 33. Thus the force developed by the weights when the shaft rotates is transmitted by the lever system to the member 33. When the shaft 21 is not running the members 32 and 33 are held in maximum separation by a pair of compression springs 37 mounted upon guide rods 38 extending between the members 32 and 33 the rods being loosely received in one of the members. At this time also the weights 34 are wholly retracted inward by the springs 37.

The movement of the member 33 is used to automatically change the driving speed ratio between the motor 11 and the shutter disc 14 in such a manner that the disc 14 will rotate at a predetermined fixed speed while the motor operates at certain selected speeds differing therefrom and which may be directly related to a series of frame speeds at which pictures may be taken.

To describe the operation of the speed controlling means, a three speed device will be presented. A greater or less number of speeds may be employed. The camera described herein is to be operated at 10 frames, 5 frames, and 2 frames per second.

Regardless of the selection of frame speeds chosen for a given application of the invention the basic exposure to which the film is subjected will be computed from the fastest frame speed. In the example chosen the basic exposure is based upon the 10 frame speed. At this speed the single opening 15 in the disc 13 will create an exposure of $1/72$ of a second which will remain the same at all frame speeds.

Starting at the highest frame speed the action of the device is as follows. The motor speed at this time will be such that the disc 13 being driven thru its fixed ratio driving means will rotate at 10 revolutions per second. At this time the governor 31 will also be running at its highest speed and the member 33 will be in its extreme left hand position at which time a drive pin 39 fixed in the member 33 will engage a driven pin 40 fixed in a rotating head 41 which is freely and concentrically rotatable in a bearing within the member 32 of the governor. The head 41 is rigidly fixed to a sleeve shaft 42 surrounding the main shaft 21 and supported at its other end by an anti-friction bearing 43 mounted in a rigid portion of the casing 19.

The shaft 42 has an enlarged end upon which is secured a gear 44 which meshes with a gear 45 secured upon an auxiliary shaft 46 which is freely rotatable in a pair of supporting bearings mounted in a supporting abutment rigid with the casing. The shaft 46 has a main driving gear 47 mounted thereon which communicates rotary motion to the shutter disc 14. The gear 47 is a bevel gear and has meshing therewith a gear 48 which is secured to a shutter driving shaft 49 which in turn is journaled in an abutment of the casing and extends at right angles to the shaft 21 and has a gear 50 thereon which in turn meshes with a gear 51 mounted directly on the shutter disc 14.

The driving ratio between the shaft 42 and the shutter disc 14 is determined by the aggregate ratio of all the gears in the train above described and is such that the disc 14 will rotate at a selected speed such as 10 revolutions per minute when the governor is running at its maximum speed. Since the disc 13 is also being driven at 10 revolutions per minute and the two discs 13 and 14 are so assembled that at this time the aperture 15 in the disc 13 and the aperture 16 in the disc 14 are in register, 10 frames of film per second are being exposed at an exposure of $1/72$ of a second.

Assuming next that is is desired to expose the film at 5 frames per second the motor 11 is slowed down to the required speed. In doing so the load on the springs 37 of the governor is reduced and the member 33 moves away from the member 32. The hub of the member 33 is provided with a keyway or slot 52 within which is received a drive pin 53 anchored rigidly in a sleeve shaft 54 concentric with the shaft 21. The pin 53 is received in the slot 52 when the member 33 has reached about the mid point of its travel a position which corresponds to the required governor speed for exposing 5 frames of film per second and as shown in the drawing.

At this time therefore the sleeve 42 is not being driven and the sleeve 54 becomes the driving member. This sleeve has a journal in the head 32 within which it freely rotates and has an anti-friction bearing 55 supporting its other end the inner race of which is carried by the sleeve 42. The outer race of the bearing 55 and the end of the sleeve 54 have secured thereto a gear 56 which meshes with a gear 57 which is secured to the auxiliary shaft 46. Thus, the disc 14 is now being driven by the sleeve shaft 54 and the gears 56 and 57. The pin 53, desirably, is provided with a roll and the slot 52 is so formed that the roll may enter the slot with a minimum of friction and shock to the mechanism. The aggregate driving ratios of all the gears at this time is calculated to drive the disc 14 at 10 revolutions per minute which speed acting together with the five revolutions per minute of the disc 13 due to the fixed ratio which always exists between the shaft 21 and the disc 13, results in exposing the film at the rate of five frames per second. It should be noted, however, that as in the first condition described that the actual quantity of light reaching the film remains the same since the exposure is made by the disc 14 traveling at 10 revolutions per minute.

Assuming now that the required frame speed is to be reduced to 2 frames per second, the motor speed is reduced to the required speed to rotate the disc 13 at 2 revolutions per minute. At this time the ratio of drive between the motor and the disc 14 must be properly established to rotate the disc at 10 revolutions per minute to maintain the uniform film exposure.

When the motor speed is reduced to this new low speed the governor springs 37 act to move the member 33 into its extreme right hand position at which time the pin 39 engages and drives a pin 58 secured in a gear 59. This gear is mounted to rotate freely upon the sleeve shaft 54 by means of an anti-friction bearing 60. The gear 59 meshes with a pinion 61 secured to the shaft 40. The motor now drives the disc 14 only thru the gears 59 and 61 the ratio of which is calculated to drive the disc 14 at 10 revolutions per minute.

It will be understood that under the latter condition the disc 13 will blank out those potential exposures which the disc 14, running at 10 revolutions per minute would make, except when the aperture 16 in the disc 14 registers with the aperture 15 in disc 13 at the film gate. Thus only two revolutions per second are made and the quantity of light reaching the film for each frame remains the same as for the other frame speeds.

The apparatus as above set forth automatically maintains the exposure at the optimum at all times and while it is highly desirable and efficient for single camera operation it is also extremely desirable for use where a multiple camera system is required. In the latter case the driving motor used may be a repeater unit in a servo driving system where the change in frame speed can be made at the master camera and all other cameras will follow. At the same time all exposure will be kept at the desired level for best results.

What is claimed is:

1. Exposure control apparatus for motion picture cameras comprising two rotary constantly driven overlying shutter discs, a power input shaft, means to drive said shaft at different selected speeds, a fixed ratio driving connection between said shaft and one of said discs, a stepped speed ratio changing mechanism between said shaft and said other disc, the ratios of the steps of which drive said other disc at the same speed for each of the selected input shaft speeds.

2. Exposure control apparatus for motion picture cameras comprising the elements defined in claim 1 together with automatic means for changing the speed ratio driving means between the input shaft and said second disc in response to changes in the speed of said input shaft.

3. Exposure control apparatus for motion picture cameras comprising a rotary disc type shutter having a quantitative light measuring means driven at a predetermined constant speed, a continuously driven frame speed determining shutter element associated with said light measuring means, an input drive shaft rotated at different selected speeds, a fixed driving ratio connection between said shaft and said frame speed element, a driving ratio shifting mechanism connected between said shaft and said light measuring means having stepped driving ratios operable to rotate said light measuring means at the same speed for each speed of said input shaft.

4. Exposure control apparatus for motion picture cameras comprising a film gate, means to advance the film strip across said gate, a shutter having two rotary continuously driven overlying light controlling discs each disc having at least one film exposing aperture, said apertures being registerable at said gate to effect an exposure on said film strip, a variable speed input drive shaft, the speeds of which are a function of a plurality of desired film frame speeds, a fixed ratio driving connection between said shaft, one of said discs and said film advancing means, a stepped speed ratio changing means between said shaft and said other disc operable to maintain fixed rotational speed of the said other disc when said drive shaft speed is changed.

5. Exposure control apparatus for motion picture cameras having the elements defined in claim 4 together with means to maintain a desired phase relation between said disc when a speed change takes place.

6. Exposure control apparatus for motion picture cameras comprising a shutter having a pair of continuously driven rotary blades having apertures therein which coact to effect exposure of the film strip, a driven input shaft, a fixed ratio driving connection between said shaft and one of said blades, automatic gear shifting means between said input shaft and the other shutter disc responsive to changes in speed of said input shaft and acting to maintain the speed of rotation of said other disc constant for each shift in speed of said input shaft.

7. Exposure control apparatus for motion picture cameras having the elements defined in claim 6 together with centrifugally operated means for changing the driving ratios of said gear shifting mechanism.

8. Exposure control apparatus for motion picture cameras comprising a shutter having two continuously driven rotating discs having apertures therein coacting to expose a film strip, means to feed the film strip, a main drive shaft driven at a plurality of predetermined speeds which are a function of the film frame speeds, said shaft having a fixed ratio drive to one of said shutter discs and said film feed, a plurality of gears of different diameters loosely mounted on said main shaft, a second shaft having gears fixed thereto meshing with those on said main shaft, a fixed ratio drive from said second shaft to said second shutter disc, a two element gear shifting means having one element fixed to said main shaft and the other driven by the first but movable axially along the shaft, centrifugal means on the gear shifting means connected to move said movable element along the shaft and means on said movable element to successively engage the gears on said shaft, the driving ratios of the said gears being such that for each predetermined speed of said main shaft the said second shutter disc will be driven at the same speed.

References Cited in the file of this patent

UNITED STATES PATENTS

| | | |
|---|---|---|
| 1,800,088 | Debrie | Apr. 7, 1931 |
| 1,839,587 | Raby et al. | Jan. 5, 1932 |
| 2,015,950 | Mayer | Oct. 1, 1935 |

FOREIGN PATENTS

| | | |
|---|---|---|
| 17,483 | Great Britain | 1912 |
| 393,513 | Germany | Apr. 4, 1924 |
| 275,661 | Great Britain | May 17, 1928 |